United States Patent
Regnat et al.

(10) Patent No.: US 11,474,009 B2
(45) Date of Patent: Oct. 18, 2022

(54) SAMPLE TRANSFER APPARATUS AND METHOD FOR TRANSFERRING A SAMPLE HOLDER INTO AND OUT OF A VACUUM CHAMBER

(71) Applicant: KIUTRA GMBH, Munich (DE)

(72) Inventors: Alexander Regnat, Oberhaching (DE); Jan Spallek, Munich (DE); Klaus Eibensteiner, Munich (DE)

(73) Assignee: KIUTRA GMBH, Munich (DE)

( * ) Notice: Subject to any disclaimer, the term of this patent is extended or adjusted under 35 U.S.C. 154(b) by 0 days.

(21) Appl. No.: 17/625,877

(22) PCT Filed: Jul. 12, 2019

(86) PCT No.: PCT/EP2019/068925
§ 371 (c)(1),
(2) Date: Jan. 10, 2022

(87) PCT Pub. No.: WO2021/008679
PCT Pub. Date: Jan. 21, 2021

(65) Prior Publication Data
US 2022/0205884 A1 Jun. 30, 2022

(51) Int. Cl.
*G01N 1/42* (2006.01)
*G01N 23/20025* (2018.01)
(Continued)

(52) U.S. Cl.
CPC .............. *G01N 1/42* (2013.01); *B01L 7/50* (2013.01); *B01L 9/50* (2013.01); *G01N 23/20025* (2013.01)

(58) Field of Classification Search
CPC .... B01L 7/50; B01L 7/525; B01L 9/50; B01L 9/52; B01L 9/523; G01N 1/42;
(Continued)

(56) References Cited

U.S. PATENT DOCUMENTS 5,986,270 A * 11/1999 Bormans ................. H01J 37/20
850/16
2007/0228049 A1 10/2007 Nordmeyer et al.
(Continued)

FOREIGN PATENT DOCUMENTS

| EP | 2141488 A1 | 1/2010 |
|----|------------|--------|
| EP | 3163222 A1 | 5/2017 |
| JP | 2000133691 A | 5/2000 |

OTHER PUBLICATIONS

Na et al., "sample-transfer-1024x483.png", Mar. 1, 2018 (Mar. 1, 2018), XP055564274, 80801 Munchen, Germany Retrieved from the Internet: URL:https://kiutra.com/wp-content/uploads/ 2018/03/sample-transfer-1024x483.png [retrieved on Mar. 4, 2019].
(Continued)

*Primary Examiner* — Jill A Warden
*Assistant Examiner* — Dwayne K Handy
(74) *Attorney, Agent, or Firm* — Scully, Scott, Murphy & Presser, P.C.

(57) ABSTRACT

The present disclosure relates to a sample transfer apparatus (100) for transferring a sample holder (200) into and out of a vacuum chamber (810), comprising: a holding device (110) including at least one cam (120) configured to cooperate with at least one follower (210) of a sample holder (200), wherein the at least one cam (120) includes a curved track having an open end portion (122), a locking portion (126), a locking track portion (124) and a releasing track portion (128), wherein the locking track portion (124) and the releasing track portion (128) respectively connect the open end portion (122) and the locking portion (126), wherein the curved track is configured such that the at least one follower (210) of the sample holder (200) is guided from the open end portion (122) to the locking portion (126) via the locking track portion (124) for attaching the sample holder (200) to the holding device (110), and wherein the
(Continued)

curved track is further configured such that the at least one follower (210) of the sample holder (200) is guided from the locking portion (126) to the open end portion (122) via the releasing track portion (128) for releasing the sample holder (200) from the holding device (110).

13 Claims, 8 Drawing Sheets

(51) Int. Cl.
*B01L 9/00* (2006.01)
*B01L 7/00* (2006.01)

(58) Field of Classification Search
CPC ........ G01N 23/20025; G01N 23/20033; H01J 37/18; H01J 37/185; H01J 37/20
See application file for complete search history.

(56) References Cited

U.S. PATENT DOCUMENTS

| 2011/0211674 A1* | 9/2011 | Thorne | G01N 23/20016 378/81 |
| 2017/0213694 A1* | 7/2017 | Lihl | G02B 21/00 |
| 2019/0195814 A1* | 6/2019 | Wogritsch | G01N 1/42 |

OTHER PUBLICATIONS

Snell et al., "Automated Sample Mounting Technical Advance and Alignment System for Biological Crystallography at a Synchrotron Source", Structure (Apr. 2004), vol. 12, pp. 537-545.
International Search Report and Written Opinion dated Apr. 1, 2020 issued in PCT/EP2019/068925.
Written Opinion dated Sep. 9, 2020 issued in PCT/EP2019/068925.
International Preliminary Report on Patentability dated Sep. 30, 2021.

* cited by examiner a)

b)

(a) (b) (c)

(a)       (b)       (c)

(a)

(b)

SAMPLE TRANSFER APPARATUS AND METHOD FOR TRANSFERRING A SAMPLE HOLDER INTO AND OUT OF A VACUUM CHAMBER

FIELD

The present disclosure relates to a sample transfer apparatus for transferring a sample holder into and out of a vacuum chamber, a system having the apparatus, a sample holder configured to be transferred into and out of a vacuum chamber, and a method for transferring a sample holder into or out of a vacuum chamber are provided. The present disclosure particularly relates to the loading and unloading of a sample holder into or out of a vacuum chamber of a cryostat. The present disclosure further relates to the loading and unloading of a sample holder by a linear movement of a sample transfer apparatus.

BACKGROUND

A cryostat is generally used to maintain low temperatures of samples mounted within the cryostat. Low temperatures may be achieved by using, for example, a cryogenic fluid bath such as liquid helium. However, the cooling medium, such as liquid helium, continuously evaporates due to external and/or internal heat input in the cryostat and therefore needs to be refilled regularly. This requires considerable time and resources, whereby the operating costs of such cryostats are high.

In order to overcome the above drawbacks, cryogen-free cryostats have been developed. Cryogen-free cryostats may employ a cryogen-free closed cycle system, such a pulse tube cryocooler. Modern pulse tube cryocoolers can achieve temperatures down to 1.2K. In order to achieve sub-Kelvin temperatures, a magnetic cooling stage can be used in addition to the cryogen-free closed cycle system. The magnetic cooling stage may be an adiabatic demagnetization refrigerator (ADR), which can achieve temperatures down to a few milli-Kelvin. ADR is based on the magneto-caloric effect. When a medium is magnetized its magnetic moments get aligned and the heat of magnetization is released. Vice versa, if the medium is demagnetized its temperature drops.

In particular at sub-Kelvin temperatures, heat input in the cryostat is crucial. The inside of the cryostat needs to be thermally insulated from the outside. For this purpose, it may be beneficial to reduce an access time when inserting a sample into the cryostat, or removing the sample from the cryostat. Further, it is beneficial to reduce or even avoid a contact between objects that come from the outside of the cryostat with the inside of the cryostat.

In view of the above, new sample transfer apparatuses, systems, sample holders, and methods, that overcome at least some of the problems in the art are beneficial.

SUMMARY

In light of the above, a sample transfer apparatus for transferring a sample holder into and out of a vacuum chamber, a system having the apparatus, a sample holder configured to be transferred into and out of a vacuum chamber, and a method for transferring a sample holder into or out of a vacuum chamber are provided.

It is an object of the present disclosure to efficiently insert a sample holder into a vacuum chamber and/or efficiently remove the sample holder from the vacuum chamber. It is another object of the present disclosure to reduce a heat input into the vacuum chamber. Further aspects, benefits, and features of the present disclosure are apparent from the claims, the description, and the accompanying drawings.

According to an aspect of the present disclosure, a sample transfer apparatus for transferring a sample holder into and/or out of a vacuum chamber is provided. The sample transfer apparatus includes a holding device having at least one cam configured to cooperate with at least one follower of a sample holder. The at least one cam includes a curved track having an open end portion, a locking portion, a locking track portion, and a releasing track portion, wherein the locking track portion and the releasing track portion respectively connect the open end portion and the locking portion. The curved track is configured such that the at least one follower of the sample holder is guided from the open end portion to the locking portion via the locking track portion for attaching the sample holder to the holding device. The curved track is further configured such that the at least one follower of the sample holder is guided from the locking portion to the open end portion via the releasing track portion for releasing the sample holder from the holding device.

According to another aspect of the present disclosure, a sample transfer apparatus for transferring a sample holder into and/or out of a vacuum chamber is provided. The sample transfer apparatus includes a holding device having at least one cam configured to cooperate with at least one follower of a sample holder. The at least one cam is configured such that the at least one follower is guided from an open end portion of the at least one cam along a first path to a locking portion of the at least one cam for attaching the sample holder to the sample transfer apparatus, and such that the at least one follower is guided from the locking portion along a second path different from the first path to the open end portion for releasing the sample holder from the sample transfer apparatus.

According to another aspect of the present disclosure, a sample transfer system for transferring a sample holder into and/or out of a vacuum chamber is provided. The sample transfer system includes a sample transfer apparatus and a sample holder. The sample transfer apparatus includes at least one cam configured to cooperate with at least one follower of the sample holder, or the sample holder includes at least one cam configured to cooperate with at least one follower of the sample transfer apparatus. The at least one cam is configured such that the at least one follower is guided from an open end portion of the at least one cam along a first path to a locking portion of the at least one cam for attaching the sample holder to the sample transfer apparatus, and such that the at least one follower is guided from the locking portion along a second path different from the first path to the open end portion for releasing the sample holder from the sample transfer apparatus.

According to another aspect of the present disclosure, a system is provided. The system includes a vacuum chamber. The system further includes the sample transfer apparatus and/or the sample holder of the embodiments of the present disclosure. The sample transfer apparatus is connectable to the system, and in particular the vacuum chamber, for a transfer of the sample transfer apparatus inside of the vacuum chamber. The system can be a cryostat. In particular, the vacuum chamber can be a vacuum chamber of a cryostat.

According to another aspect of the present disclosure, a sample holder configured to be transferred into and/or out of a vacuum chamber is provided. The sample holder includes at least one follower configured to cooperate with at least one cam of a holding device of the sample transfer apparatus according to the embodiments of the present disclosure.

According to another aspect of the present disclosure, a sample holder configured to be transferred into and/or out of a vacuum chamber is provided. The sample holder includes at least one cam configured to cooperate with at least one follower of a holding device of a sample transfer apparatus. The at least one cam includes a curved track having an open end portion, a locking portion, a locking track portion, and a releasing track portion, wherein the locking track portion and the releasing track portion respectively connect the open end portion and the locking portion. The curved track is configured such that the at least one follower of the holding device is guided from the open end portion to the locking portion via the locking track portion for attaching the sample holder to the holding device. The curved track is further configured such that the at least one follower of the holding device is guided from the locking track portion to the open end portion via the releasing track portion for releasing the sample holder from the holding device.

According to another aspect of the present disclosure, a method for transferring a sample holder into or out of a vacuum chamber is provided. The method includes attaching the sample holder to a holding device of a sample transfer apparatus by: inserting at least one follower in an open end portion of a curved track of a cam, moving the at least one follower along a locking track portion of the curved track to a locking portion of the curved track, and locking the at least one follower in the locking portion; transferring the sample holder into or out of the vacuum chamber using the sample transfer apparatus; and releasing the sample holder from the holding device by: releasing the at least one follower from the locking portion, and moving the at least one follower along a releasing track portion of the curved track to the open end portion of the curved track.

Embodiments are also directed at apparatuses for carrying out the disclosed methods and include apparatus parts for performing each described method aspect. These method aspects may be performed by way of hardware components, a computer programmed by appropriate software, by any combination of the two or in any other manner. Furthermore, embodiments according to the disclosure are also directed at methods for operating the described apparatus. It includes method aspects for carrying out every function of the apparatus.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Reference will now be made in detail to the various embodiments of the disclosure, one or more examples of which are illustrated in the figures. Within the following description of the drawings, the same reference numbers refer to same components. Generally, only the differences with respect to individual embodiments are described. Each example is provided by way of explanation of the disclosure and is not meant as a limitation of the disclosure. Further, features illustrated or described as part of one embodiment can be used on or in conjunction with other embodiments to yield yet a further embodiment. It is intended that the description includes such modifications and variations.

At low and ultra-low temperatures, it may be beneficial to reduce an access time when inserting a sample into the cryostat, or removing the sample from the cryostat. Further, it is beneficial to reduce or even avoid a contact between objects that come from the outside of the cryostat with the inside of the cryostat.

The present disclosure uses a cam along which a follower is guided during the insertion or removal of the sample holder. The cam is shaped such that the sample holder can be attached to, and released from, the sample transfer apparatus by a linear movement of the sample holder and/or the sample transfer apparatus. Accordingly, no further movements such as rotational movements are required. The sample holder can be attached to, and released from, the sample transfer apparatus by simply pushing the sample holder against the sample transfer apparatus or the sample transfer apparatus against the sample holder.

Thereby, the sample holder can be efficiently inserted into the vacuum chamber and/or efficiently removed from the vacuum chamber. Further, a heat input into the vacuum chamber e.g. of the cryostat can be reduced, in particular since only the sample holder remains in the vacuum chamber while the sample transfer apparatus can be removed therefrom after the sample holder has been inserted.

Figure 1:
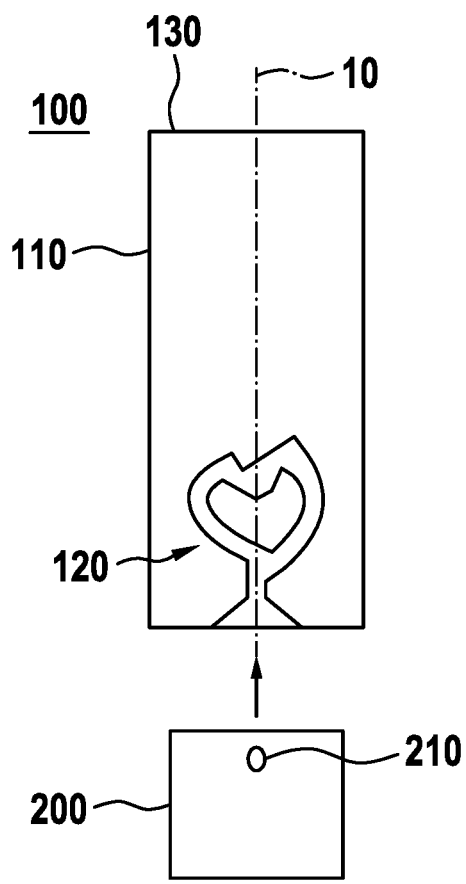
FIG. 1 shows a schematic view of a sample transfer apparatus for transferring a sample holder into and out of a vacuum chamber according to embodiments described herein.
Figure 1:
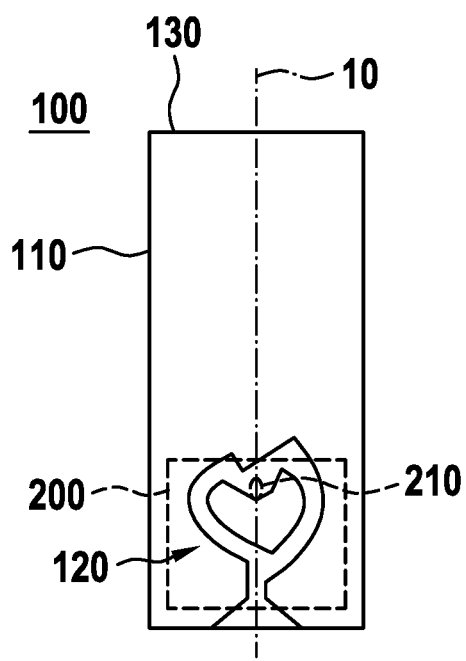

FIG. 1 shows a schematic view of a sample transfer apparatus 100 for transferring a sample holder 200 into and/or out of a vacuum chamber according to embodiments described herein. FIG. 1(a) shows the sample holder 200 detached from the sample transfer apparatus 100, and FIG. 1(b) shows the sample holder 200 fixedly attached to the sample transfer apparatus 100.

The sample transfer apparatus 100 includes a holding device 110 having at least one cam 120 configured to cooperate with at least one follower 210 of a sample holder 200. The at least one cam 120 has a shape configured for attaching and releasing the sample holder by a linear movement, and in particular by pushing the sample holder 200 against the sample transfer apparatus 100, or by pushing the sample transfer apparatus 100 against the sample holder 200. In some implementations, at least a portion of the holding device 110 which includes the at least one cam 120 can be manufactured using an additive-manufacturing technique.

According to some embodiments, which can be combined with other embodiments described herein, the holding device 110 is configured such that the sample holder 200 moves only linearly with respect to a longitudinal axis 10 of the holding device 110 during the attaching and the releasing of the sample holder 200. In other words, the holding device 110 is configured such that the sample holder 200 does not perform an angular movement (i.e., rotate) with respect to the longitudinal axis 10 of the holding device 110 during the attaching and the releasing of the sample holder 200. Thereby, the sample holder 200 can be aligned and fixed to a stationary base in the vacuum chamber.

In some implementations, the longitudinal axis 10 can be essentially parallel to a vertical direction. In other words, the longitudinal axis 10 can be an essentially vertical axis. For example, the longitudinal axis 10 can be essentially parallel to a vertical direction during the attaching and the releasing of the sample holder 200.

The term "vertical direction" or "vertical orientation" is understood to distinguish over "horizontal direction" or "horizontal orientation". That is, the "vertical direction" or "vertical orientation" relates to an essentially vertical orientation e.g. of the sample transfer apparatus 100 and/or the longitudinal axis 10, wherein a deviation of a few degrees, e.g. up to 10° or even up to 15°, from an exact vertical direction or vertical orientation is still considered as an "essentially vertical direction" or an "essentially vertical orientation". The vertical direction can be essentially parallel to the force of gravity.

According to some embodiments, which can be combined with other embodiments described herein, the holding device 110 has a cylindrical shape. The term "cylinder" can be understood as commonly accepted as having a circular bottom shape and a circular upper shape and a curved surface area or shell connecting the upper circle and the lower circle. The longitudinal axis 10 of the holding device 110 may correspond to a cylinder axis of the cylinder.

In some implementations, the at least one cam 120 is provided at an inner surface of the cylindrical holding device 110. For example, the at least one cam 120 can be a cut-out which extends through a wall or thickness of the cylindrical holding device 110.

According to some embodiments, which can be combined with other embodiments described herein, the holding device 110 includes a reception space for the sample holder 200. The reception space may be an interior space of the holding device 110. The sample holder 200 may be insertable in the holding device 110, and in particular the reception space which may be defined by an interior of the cylinder. For example, the holding device 110 may be configured such that the sample holder 200 does not protrude out of the holding device 110 when the sample holder 200 is attached to the holding device 110. Thereby, the sample holder 200 can be protected during the loading and/or unloading procedure.

The sample holder 200 may have an outer shape corresponding to an inner shape of the holding device 110. For example, the sample holder 200 may have a cylindrical outer shape corresponding to a cylindrical inner shape of the reception space of the holding device 110. Thereby, a movement of the sample holder 200 inside the holding device 110 can be limited.

According to some embodiments, which can be combined with other embodiments described herein, the sample transfer apparatus 100 may include connection means 130 connectable to a transfer mechanism. The transfer mechanism can be configured to transfer the sample transfer apparatus 100 from the outside of the vacuum chamber into the vacuum chamber and from the inside of the vacuum chamber to the outside of the vacuum chamber. In some implementations, the transfer mechanism may include a drive or motor to move the sample transfer apparatus 100 into and out of the vacuum chamber. The transfer mechanism may further include a vacuum lock.

Figure 2:
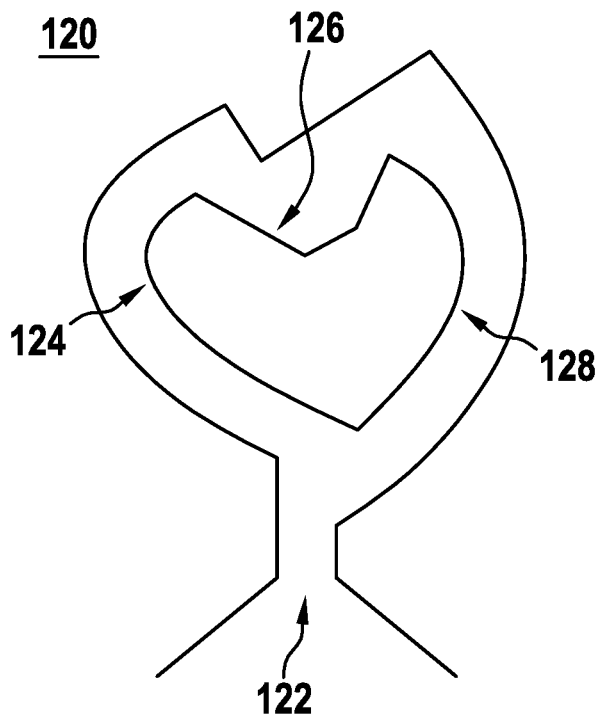
FIG. 2 shows a schematic view of a cam according to embodiments described herein.

FIG. 2 shows a schematic view of a cam 120 according to embodiments described herein.

The at least one cam 120 of the holding device includes a curved track having an open end portion 122, a locking portion 126, a locking track portion 124, and a releasing track portion 128. The locking track portion 124 and the releasing track portion 128 respectively connect the open end portion 122 and the locking portion 126. In particular, a first (or upper) end of the locking track portion 124 and a first (or upper) end of the releasing track portion 128 may provide, or terminate at, the locking portion 126. Similarly, a second (or lower) end of the locking track portion 124 and a second (or lower) end of the releasing track portion 128 may provide, or terminate at, the open end portion 122. The open end portion is a portion of the curved tack which is open in a direction parallel to the longitudinal axis of the holding device 110.

The curved track is configured such that the at least one follower of the sample holder is guided from the open end portion 122 to the locking portion 126 via the locking track portion 124 for attaching the sample holder 200 to the holding device. The curved track is further configured such that the at least one follower of the sample holder is guided from the locking portion 126 to the open end portion 122 via the releasing track portion 128 for releasing the sample holder from the holding device.

According to some embodiments, which can be combined with other embodiments described herein, the curved track of the at least one cam 120 is a loop and/or heart-shaped, and in particular an asymmetric loop and/or asymmetrically heart-shaped. The asymmetry may be defined with respect to the longitudinal axis of the holding device 110. However, the present disclosure is not limited thereto and other (e.g. asymmetrical) shapes may be used which allow to attach the sample holder 200 via the locking track portion 124 and release the sample holder 200 via another portion of the curved track, namely the releasing track portion 124.

The locking portion 126 may be configured to lock the at least one follower of the sample holder in a predetermined position. For example, the curved track may extend along the longitudinal axis of the holding device, wherein the locking portion 126 is arranged between the locking track portion 124 and the releasing track portion 128, and wherein the locking track portion 124 and the releasing track portion 128 extend further along the longitudinal axis in a direction away from the open end portion 122 than the locking portion 126. Accordingly, the locking portion 126 is provided as a recess or depression which can lock the at least one follower of the sample holder in a predetermined position.

Figure 3A:
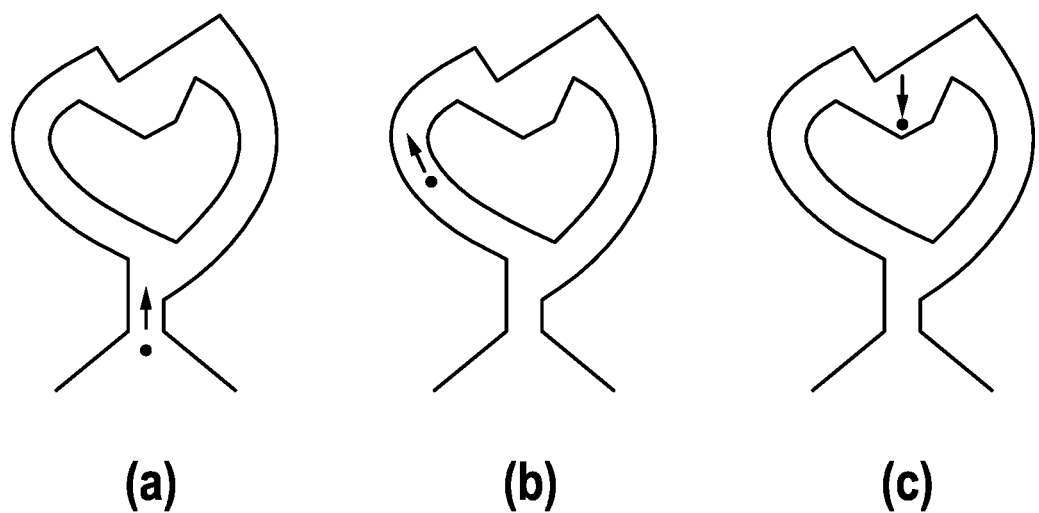
FIGS. 3A and B show schematic views of an attaching and releasing of a sample holder according to embodiments described herein.
Figure 3B:
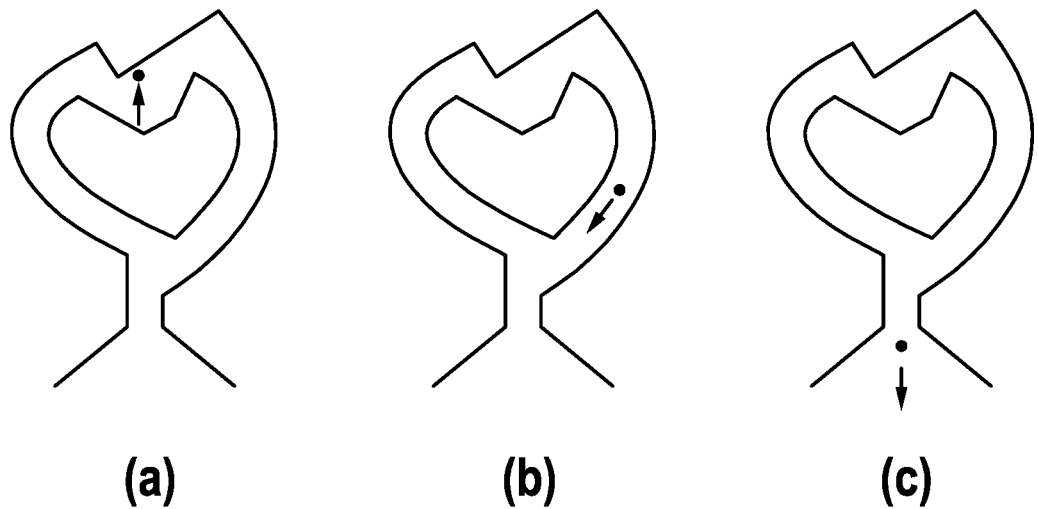

FIGS. 3A and 3B show schematic views of an attaching and releasing, respectively, of a sample holder according to embodiments described herein.

Referring to FIG. 3A (a), the follower is inserted in the open end portion. The open end portion is connected to the locking track portion, wherein the curved track is shaped such that the follower is forced into the locking track portion after the follower has been inserted in the open end portion. The follower then moves along the non-linear locking track portion (FIG. 3A (b)) and reaches the locking portion where the follower is locked in a predetermined position (FIG. 3A (c)). For example, the follower can move downwards in a recess or depression such that the follower is fixed.

Referring to FIG. 3B (a), the follower is removed from the locking portion e.g. by an upwards movement. The locking portion is connected to the releasing track portion, wherein the curved track is shaped such that the follower is forced into the releasing track portion after the follower has left the locking portion. The follower then moves along the non-linear releasing track portion (FIG. 3B (b)) and reaches the open end portion where the follower can leave the curved track (FIG. 3A (c)). For example, the follower can move downwards out of the curved track such that the sample holder can be detached from the sample transfer apparatus.

As it is illustrated in FIGS. 3A and B, the curved track may have a shape such that the follower is guided or forced along a first path when the sample holder is attached to the sample transfer apparatus, and is guided or forced along a second path when the sample holder is released from the sample transfer apparatus. The first path and the second path are different paths. For example, the first path and the second path may be asymmetric with respect to the longitudinal axis of the holding device in order to provide the different guiding of the follower.

Figure 4:
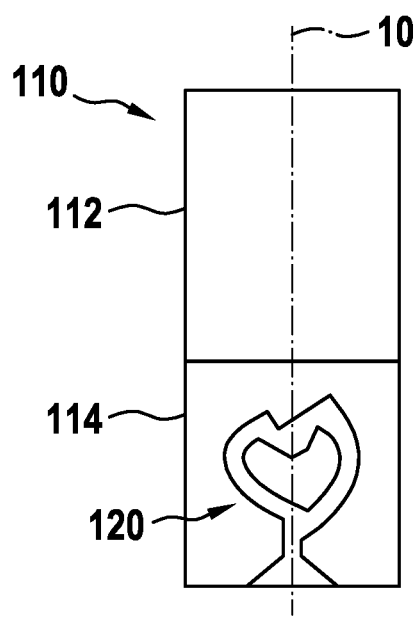
FIG. 4 shows a schematic view of a sample transfer apparatus for transferring a sample holder into and out of a vacuum chamber according to further embodiments described herein.

FIG. 4 shows a schematic view of a sample transfer apparatus for transferring a sample holder into and out of a vacuum chamber according to further embodiments described herein.

According to some embodiments, which can be combined with other embodiments described herein, the holding device 110 includes a first section 112 and a second section 114 moveably connected to the first section 122. The second section 114 may include the at least one cam 120. The first section 112 and the second section 114 may be arranged along the longitudinal axis 10 of the holding device 110.

In some implementations, at second section 114 of the holding device 110 can be manufactured using an additive-manufacturing technique. The first section 112 and the second section 114 can be made of the same or different materials.

In some implementations, the first section 112 and the second section 114 may be connected to each other by a tongue-and-groove connection. In particular, the first section 112 may have at least one tongue and the second section 114 may have at least one groove. Alternatively, the second section 114 may have at least one tongue and the first section 112 may have at least one groove. The connection between the first section 112 and the second section 114 is configured to allow a movement of the second section 114 with respect to the first section 112.

In some implementations, the second section 114 is rotatable around a rotational axis, which may be parallel (or identical) to the longitudinal axis 10 of the holding device 110. The second section 114 may be configured to rotate around the rotational axis such that the sample holder is linearly and non-rotationally moved when the at least one follower of the sample holder is guided along the curved track of the at least one cam to attach or release the sample holder.

For example, the sample holder and the first section 112 may move only linearly with respect to each other to attach or release the sample holder. Further, the second section 114 may rotate with respect to both the first section 112 and the sample holder when the sample holder is attached or released. In other words, an angular orientation of the sample holder and the first section 112 with respect to each other remains essentially the same, while an angular orientation of the second section 114 with respect to both the sample holder and the first section 112 changes to allow the sample holder to be attached or released by an only-linear movement.

In some embodiments, the second section 114 may rotate in a plane essentially perpendicular to the longitudinal axis of the holding device 100. The term "essentially perpendicular" relates to an essentially perpendicular orientation e.g. of the longitudinal axis and plane, wherein a deviation of a few degrees, e.g. up to 5° or even up to 10°, from an exact perpendicular orientation is still considered "essentially perpendicular".

Figure 5:
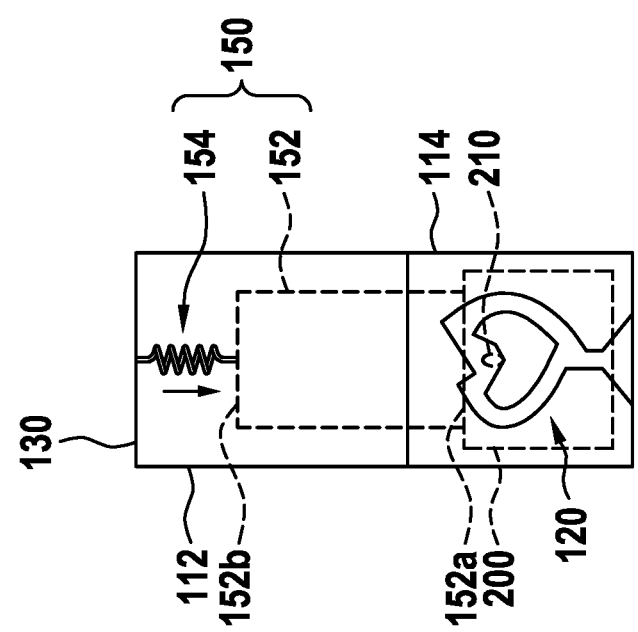
FIG. 5 shows a schematic view of a sample transfer apparatus for transferring a sample holder into and out of a vacuum chamber according to yet further embodiments described herein.

FIG. 5 shows a schematic view of a sample transfer apparatus for transferring a sample holder into and out of a vacuum chamber according to further embodiments described herein.

According to some embodiments, which can be combined with other embodiments described herein, the sample transfer apparatus includes a fixing device 150 configured to contact the sample holder 200 to prevent a movement of the sample holder 200 along the longitudinal axis of the holding device. For example, the fixing device 150 may be configured to prevent a vertical movement of the sample holder 200 after the sample holder 200 has been attached to the sample transfer apparatus.

The prevention of the movement of the sample holder 200 by means of the fixing device 150 may be provided up to a predetermined external force applied along the longitudinal axis of the holding device. When the predetermined external force is exceeded, the sample holder 200 may move along the longitudinal axis e.g. to release the locking state of the sample holder 200.

In some implementations, the fixing device 150 may include at least one contact element 152 and at least one elastic element 154. The at least one contact element 152 may have a first end 152a and a second end 152b, wherein the first end 152a is configured to contact the sample holder 200, and wherein the second end 152b is connected to the at least one elastic element 154. The first end 152a may be a lower end of the at least one contact element 152, and the second end 152b may be an upper end of the at least one contact element 152.

According to some embodiments, the at least one contact element 152 may have a cylindrical shape. A diameter of the at least one contact element 152 may be smaller than a diameter of the holding device. Additionally, or alternatively, the diameter of the at least one contact element 152 may be equal to, or smaller than, a diameter of the sample holder 200.

In some implementations, the fixing device 150 is arranged in an interior space of the holding device 110. For example, the fixing device 150 may be arranged above the reception space of the holding device 110 which is configured to accommodate the sample holder 200.

According to some embodiments, the at least one elastic element 154 is a single elastic element or is multiple elastic elements. The at least one elastic element 154 can be a spring, such as a coil spring. A first end of the at least one elastic element 154 can be connected to the holding device 110, and a second end of the at least one elastic element 154 can be connected to the second end 152b of the at least one contact element 152.

The at least one elastic element 154 can provide an elastic force against the sample holder 200. The elastic force thus may be referred to as a "holding force". For example, the elastic force can press or push the at least one follower 210 of the sample holder 200 into the locking portion of the at least one cam 120 such that the at least one follower 210 is locked in the predetermined position. For releasing the sample holder 200, a user may press or push the sample holder in a direction opposite to a direction of the holding force provided by the at least one elastic element 154 to remove the at least one follower 210 from the locking portion of the at least one cam 120.

Figure 6:
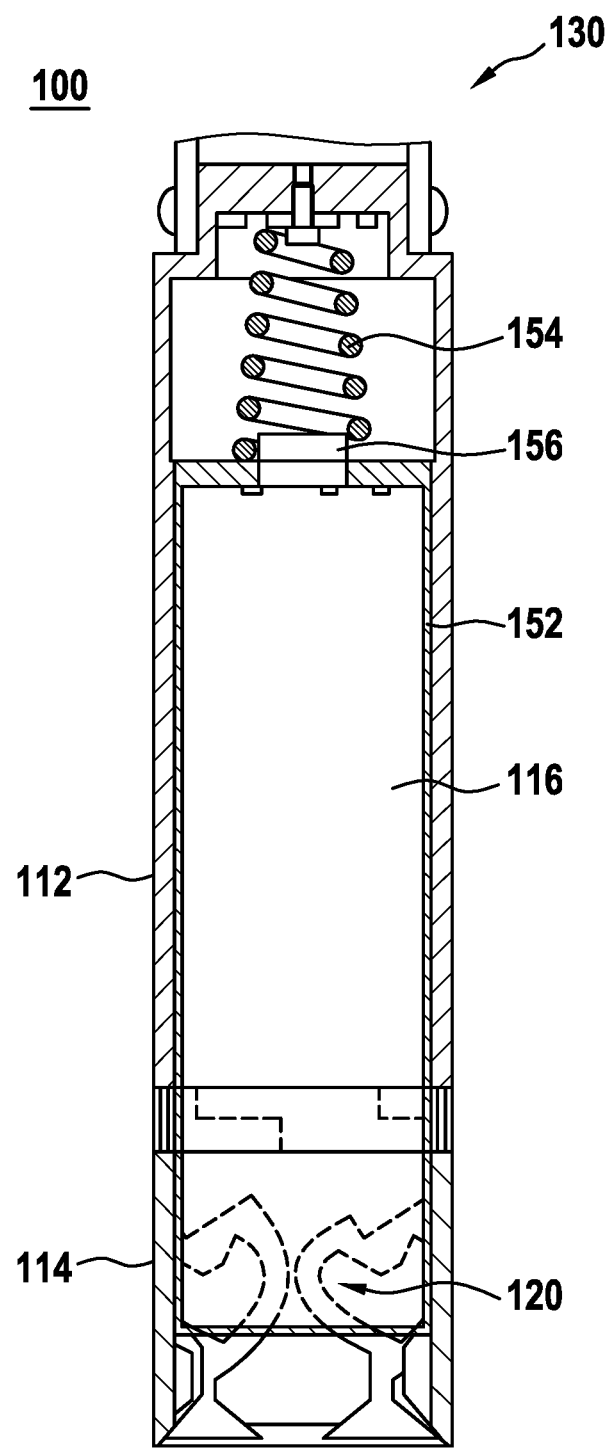
FIG. 6 shows a schematic view of a sample transfer apparatus for transferring a sample holder into and out of a vacuum chamber according to further embodiments described herein.

FIG. 6 shows a schematic view of a sample transfer apparatus 100 for transferring a sample holder into and out of a vacuum chamber according to further embodiments described herein. The sample transfer apparatus 100 is similar to the apparatuses described with respect to FIGS. 1 to 5, and a description of similar or identical aspects is thus not repeated.

According to some embodiments, which can be combined with other embodiments described herein, the sample transfer apparatus includes two or more cams each having a respective curved track. For example, the sample transfer apparatus includes three or even four cams. The sample holder may have a number of followers corresponding to the number of cams.

Figure 7:
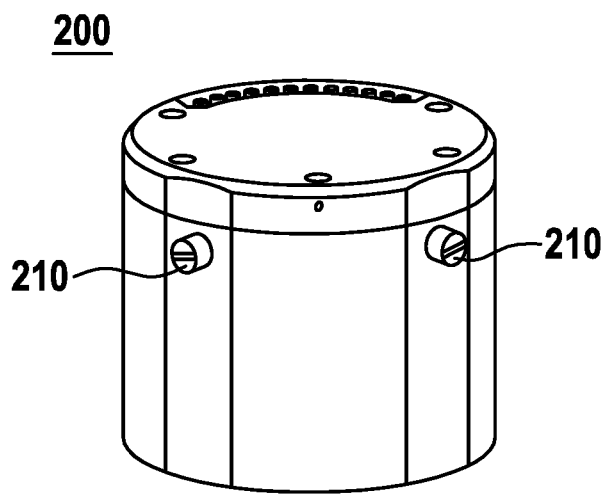
FIG. 7 shows schematic views of a sample holder according to embodiments described herein.
Figure 7:
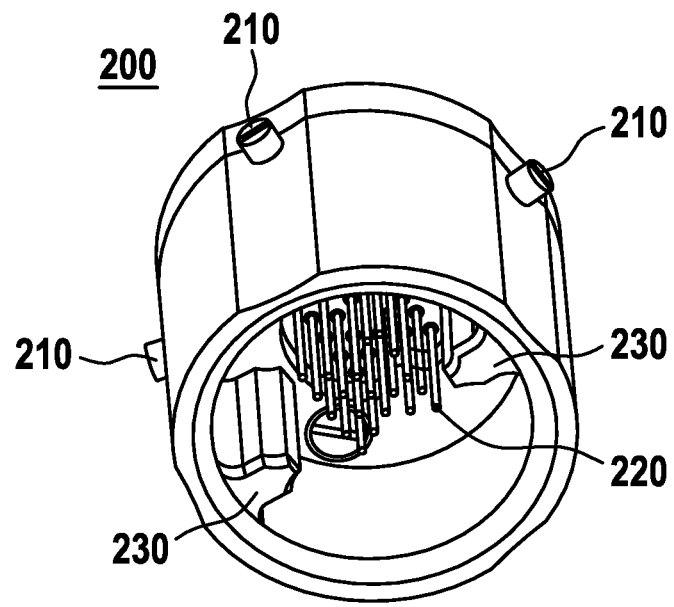

FIG. 7 shows schematic views of a sample holder 200 according to embodiments described herein. The sample holder 200 may also be referred to as a "puck".

The sample holder 200 may be configured for a mechanical connection to a base inside of the vacuum chamber. In particular, the sample transfer apparatus can be used to transfer the sample holder 200 into the vacuum chamber and connect the sample holder 200 with the base. Thereafter, the sample transfer apparatus can be removed from the vacuum chamber while the sample holder 200 remains inside of the vacuum chamber. Thereby, a heat input into the vacuum chamber of a cryostat can be reduced and lower temperatures can be reached.

According to some embodiments, the sample holder 200 may include one or more guides 230. The one or more guides 230 can ensure that the sample holder 220 is in a predetermined orientation during at least a part of the transfer into the vacuum chamber. The predetermined orientation may be selected such that the sample holder 200 connects to the base without an additional rotation of the sample holder 200. The one or more guides 230 can be provided on an inner circumference of the sample holder 200, e.g. if at least a portion of the sample holder 200 is a hollow cylinder. For example, the one or more guides 230 can be protrusions on the inner circumference of the hollow cylinder. The one or more guides 230 can be configured for an engagement with corresponding one or more elements in the vacuum chamber and/or the base and/or the sample transfer apparatus.

In some implementations, the sample holder 200 can have an essentially cylindrical shape. The sample holder 200 can have a first side (e.g. an upper side), a second side (e.g. a lower side) opposite the first side, and a circumferential (outer) side connecting the first side and the second side. The at least one follower 210 can be provided on the circumferential (outer) side. For example, the at least one follower 210 can be a protrusion on the circumferential (outer) side.

The sample holder 200 may be configured to carry a sample for testing or examination. For example, the first side of the sample holder 200 can have, or be, a sample support surface. The sample can be mounted on the sample support surface using mechanical means (e.g. a clamp) and/or an adhesive (e.g. GE varnish).

According to some embodiments, one or more physical characteristics of the sample can be measured at low or ultra-low temperatures. The one or more physical characteristics may include, but are not limited to, magnetization, resistivity, and conductivity. Optionally, the one or more physical characteristics of the sample can be measured under external conditions, such as external magnetic fields and/or pressure.

In some implementations, the sample holder 200 may be configured for an electrical and/or optical connection to the base inside of the vacuum chamber. In the example of FIG. 7, a plurality of electrical connectors 220 are illustrated. The plurality of electrical connectors 220 can be pins. The plurality of electrical connectors 220 can be provided at the second side of the sample holder 200 and can be configured for engagement with a corresponding plurality of electrical connectors at the base. For example, the plurality of electrical connectors 220 can be provided inside the hollow cylinder of the sample holder 200.

According to some embodiments, the plurality of electrical connectors 220 include at least one connector having a longitudinal extension which is shorter than that of the other connectors. The longitudinal extension may be defined essentially parallel to the longitudinal axis of the holding device of the sample transfer apparatus. The at least one connector, which is the shortest connector, can be a test connector or test pin. In particular, if an electrical connection between the base and the shortest connector is established and confirmed, it can be readily assumed that all of the other (longer) connectors are connected, too.

The electrical and/or optical connections can provide a connection between the sample and the outside of the vacuum chamber to measure the one or more physical characteristics. Additionally, or alternatively, the electrical and/or optical connections can provide a connection between at least one device on (or in) the sample holder and the outside of the vacuum chamber. The at least one device can be selected from the group including, or consisting of, a thermometer and a magnetic field sensor. However, the at least one device is not limited thereto.

In some implementations, a plurality of electrical and/or optical terminals can be provided on the first side of the sample holder 200. The plurality of electrical and/or optical terminals can be connected to the plurality of electrical (and/or optical) connectors 220. The plurality of electrical and/or optical terminals can be configured for a connection with the sample and/or the at least one device (e.g. a thermometer) on the first side of the sample holder 200.

In the exemplary embodiments described above, the sample transfer apparatus includes the at least one cam and the sample holder includes the at least one corresponding follower. However, the present disclosure is not limited thereto and the sample holder may include the at least one cam and the sample transfer apparatus may include the at least one corresponding follower.

In particular, according to an aspect of the present disclosure, a sample holder configured to be transferred into and/or out of a vacuum chamber is provided. The sample holder includes at least one cam configured to cooperate with at least one follower of a holding device of a sample transfer apparatus. The at least one cam includes a curved track having an open end portion, a locking portion, a locking track portion and a releasing track portion, wherein the locking track portion and the releasing track portion respectively connect the open end portion and the locking portion. The curved track is configured such that the at least one follower of the holding device is guided from the open end portion to the locking portion via the locking track portion for attaching the sample holder to the holding device. The curved track is further configured such that the at least one follower of the holding device is guided from the locking track portion to the open end portion via the releasing track portion for releasing the sample holder from the holding device.

Figure 8:
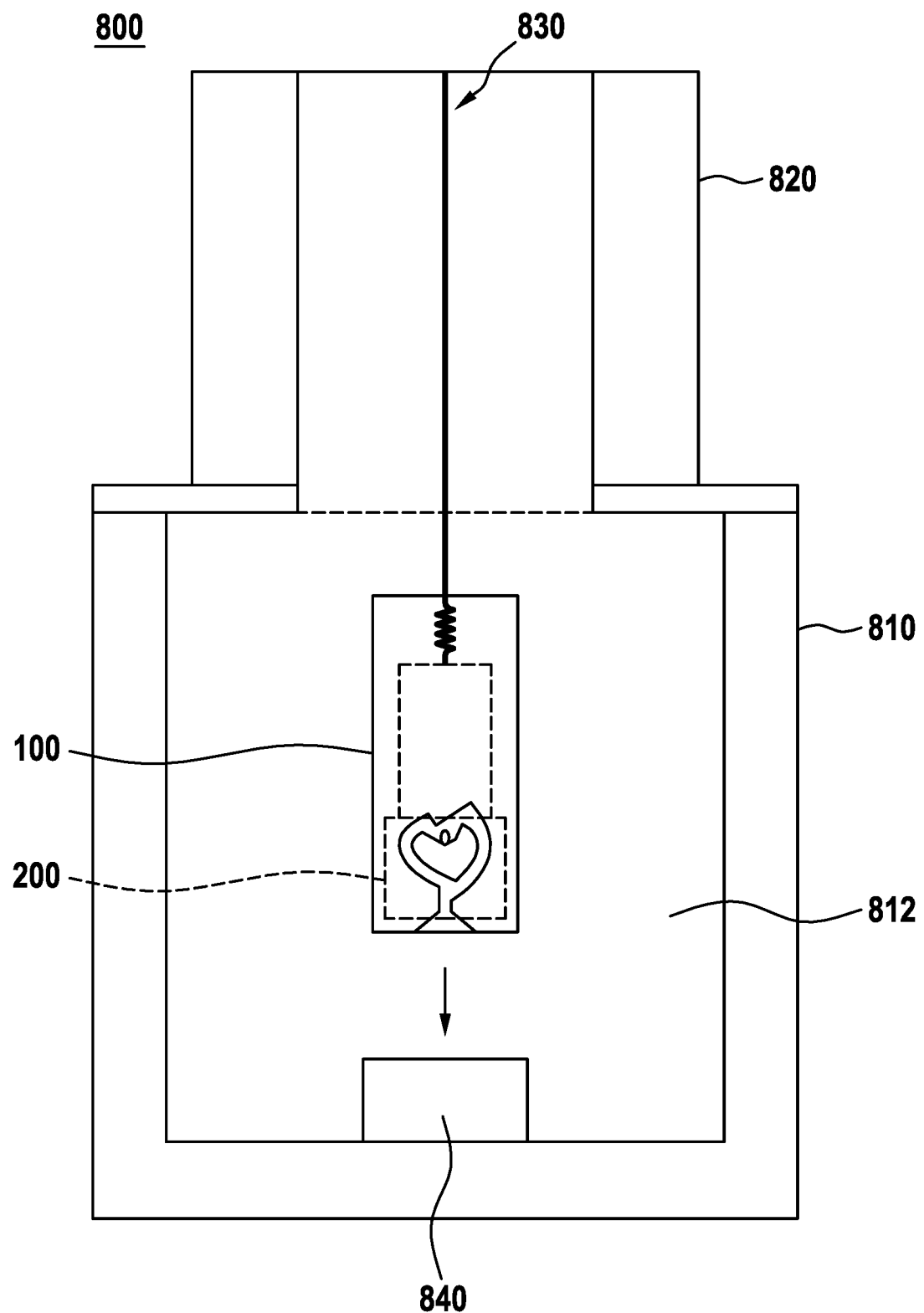
FIG. 8 shows schematic views of a system according to embodiments described herein.

FIG. 8 shows schematic views of a system 800 according to embodiments described herein. The system can be a cryostat, such as a cryogen-free cryostat.

The system 800 includes a vacuum chamber 810. The system 800 further includes the sample transfer apparatus 100 and/or the sample holder 200 of the embodiments of the present disclosure.

The vacuum chamber 810 has an interior space 812 which is configured to contain a vacuum. The vacuum chamber 810 seals the interior space 812 from the outside essentially gas-tight, vacuum-tight, heat-impermeable, and/or radiation-impermeable. Optionally, the vacuum chamber 810 may electrically insulate the interior space 812 from the outside.

A vacuum is generally understood as a space essentially devoid of matter. The term "vacuum" as used throughout the present application is in particular understood as a technical vacuum, i.e., a region with a gaseous pressure much less than atmospheric pressure. The vacuum inside the vacuum chamber 810 can be high vacuum or ultra-high vacuum. One or more vacuum generation sources, such as turbo pumps and/or cryo pumps (not shown), can be connected to the vacuum chamber 810 to generate the vacuum.

The system 800 may include an access port 820 having an inner space and a vacuum lock. The vacuum lock may seal the interior space 812 from the inner space of the access port 820 essentially vacuum-tight in a closed state, and may allow an access to the interior space 812 in an open state. For example, the vacuum lock can be closed and the sample transfer apparatus having the sample holder attached thereto can be placed in the inner space of the access port 820 e.g. under atmospheric pressure. The inner space of the access port 820 can be sealed from the outside and a technical vacuum can be generated in the inner space. Then, the vacuum lock can be opened to connect the interior space 812 of the vacuum chamber 810 and the inner space of the access port 820. The sample transfer apparatus 100 having the sample holder 200 attached thereto can be inserted into the vacuum chamber 810 using a transfer mechanism 830. The sample holder 200 is mechanically attached to the base 840, the sample holder 200 is released from the sample transfer apparatus 100, and the sample transfer apparatus 100 is removed from the inner space 812. The vacuum lock can be closed and the system 800 can be operated to examine the sample on the sample holder 200.

The system 800 can be configured to provide temperatures inside of the vacuum chamber in a range between 5 mK and 300 K, particularly in a range between 5 mK and 250 K, particularly in a range between 5 mK and 200 K, particularly in a range between 5 mK and 150 K, particularly in a range between 5 mK and 100 K, and more particularly in a range between 5 mK and about 70 K. In some implementations, even if the system is a cryostat, temperatures up to room temperature can be provided to conduct measurements on samples.

According to some embodiments, which can be combined with other embodiments described herein, the system 800 is an adiabatic demagnetization refrigerator, and in particular a multi-stage adiabatic demagnetization refrigerator. The multi-stage adiabatic demagnetization refrigerator may be configured to operate at 1K or below, particularly at 500 mK or below, particularly at 100 mK or below, and particularly at 50 mK or below. However, as mentioned above, the present disclosure is not limited thereto and the system 800 can be operated at higher temperatures, i.e. temperatures of 1K or higher, e.g. up to room temperature.

Compared to conventional systems (e.g. a sample rod/rigid system), the use of the automatic locking mechanism of the present disclosure allows very fast sample insertion and removal. No additional steps for thermal coupling of the sample to the system are necessary. All steps (inserting the sample holder, coupling the sample holder to the system, decoupling the sample transfer apparatus (cage) from the sample holder, removing the sample transfer apparatus from the system; or inserting the sample transfer apparatus into the system, coupling the sample transfer apparatus to the sample holder, decoupling the sample holder from the system, removing the sample transfer apparatus and sample holder from the system) can be performed with a single linear motion. This allows a very fast sample change.

Since no torque has to be transmitted to couple the sample holder to the system, a bellows driven by a cable can be used in conjunction with the sample transfer apparatus of the present disclosure, which makes the use of a rigid connecting rod superfluous. By using the bellows in combination with a cable pull, a transfer mechanism with a flexible length can be realized. This reflects in a reduction in the possible overall heights of such a system.

Since the linear movement is easily controllable, automation of the process is simplified, or is made possible in the first place.

Figure 9:
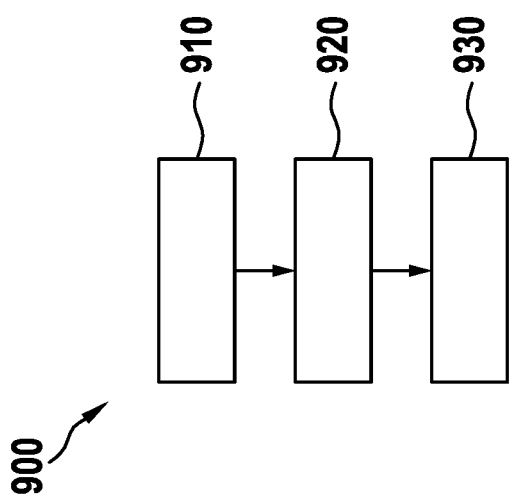
FIG. 9 shows a flow chart of a method for transferring a sample holder into or out of a vacuum chamber according to embodiments described herein.

FIG. 9 shows a flow chart of s method 900 for transferring a sample holder into or out of a vacuum chamber e.g. of a cryostat according to embodiments described herein.

The method 900 includes in block 910 attaching the sample holder to a holding device of a sample transfer apparatus by: inserting at least one follower in an open end portion of a curved track of a cam, moving the at least one follower along a locking track portion of the curved track to a locking portion of the curved track, and locking the at least one follower in the locking portion; in block 920 transferring the sample holder into or out of the vacuum chamber using the sample transfer apparatus; and in block 930 releasing the sample holder from the holding device by: releasing the at least one follower from the locking portion, and moving the at least one follower along a releasing track portion of the curved track to the open end portion of the curved track.

According to embodiments described herein, the method for transferring a sample holder into or out of a vacuum chamber can be conducted by means of computer programs, software, computer software products and the interrelated controllers, which can have a CPU, a memory, a user interface, and input and output means being in communication with the corresponding components of the apparatus for transferring a sample holder into and out of a vacuum chamber.

The present disclosure uses a cam along which a follower is guided during the insertion or removal of the sample holder. The cam is shaped such that the sample holder can be attached to, and released from, the sample transfer apparatus by a linear movement of the sample holder and/or the sample transfer apparatus. Accordingly, no further movements such as rotational movements are required. The sample holder can be attached to, and released from, the sample transfer apparatus by simply pushing the sample holder against the sample transfer apparatus or the sample transfer apparatus against the sample holder.

While the foregoing is directed to embodiments of the disclosure, other and further embodiments of the disclosure may be devised without departing from the basic scope thereof, and the scope thereof is determined by the claims that follow.

The invention claimed is:

1. A sample transfer apparatus for transferring a sample holder into and out of a vacuum chamber, comprising:
 a holding device including at least one cam configured to cooperate with at least one follower of a sample holder,
 wherein the at least one cam includes a curved track having an open end portion, a locking portion, a locking track portion, and a releasing track portion, wherein the locking track portion and the releasing track portion respectively connect the open end portion and the locking portion, and wherein the open end portion is a portion of the curved track which is open in a direction parallel to a longitudinal axis of the holding device,
 wherein the curved track is configured such that the at least one follower of the sample holder is guided from the open end portion to the locking portion via the locking track portion for attaching the sample holder to the holding device,
 wherein the curved track is further configured such that the at least one follower of the sample holder is guided from the locking portion to the open end portion via the releasing track portion for releasing the sample holder from the holding device,
 wherein the sample transfer apparatus is configured to mechanically connect the sample holder to a base inside the vacuum chamber when transferring the sample holder into the vacuum chamber, and
 wherein the sample transfer apparatus is configured to mechanically disconnect the sample holder from the base inside the vacuum chamber when transferring the sample holder out of the vacuum chamber.

2. The sample transfer apparatus of claim 1, wherein the holding device is configured such that the sample holder moves only linearly with respect to a longitudinal axis of the holding device during the attaching and the releasing of the sample holder.

3. The sample transfer apparatus of claim 1, wherein the holding device includes a first section and a second section moveably connected to the first section, wherein the second section includes the at least one cam.

4. The sample transfer apparatus of claim 3, wherein the second section is rotatable around a rotational axis parallel to a longitudinal axis of the holding device.

5. The sample transfer apparatus of claim 4, wherein the second section is configured to rotate around the rotational axis such that the sample holder is linearly and non-rotationally moved when the at least one follower of the sample holder is guided along the curved track of the at least one cam to attach or release the sample holder.

6. The sample transfer apparatus of claim 1, wherein the holding device has a cylindrical shape.

7. The sample transfer apparatus of claim 1, further including:
 a fixing device configured to contact the sample holder to prevent a movement of the sample holder along the longitudinal axis of the holding device.

8. The sample transfer apparatus of claim 7, wherein the fixing device includes:
 at least one elastic element; and
 at least one contact element having a first end and a second end, wherein the first end is configured to contact the sample holder, and wherein the second end is connected to the at least one elastic element.

9. The sample transfer apparatus of claim 7, wherein the fixing device is arranged in an interior space of the holding device.

10. The sample transfer apparatus of claim 1, wherein the curved track of the at least one cam is at least one of a loop and heart-shaped.

11. The sample transfer apparatus of claim 1, wherein the curved track of the at least one cam extends along the longitudinal axis of the holding device, wherein the locking portion is arranged between the locking track portion and the releasing track portion, and wherein the locking track portion and the releasing track portion extend further along the longitudinal axis in a direction away from the open end portion than the locking portion.

12. A method for transferring a sample holder into or out of a vacuum chamber, comprising:
 a) attaching the sample holder to a holding device of a sample transfer apparatus by:
  inserting at least one follower in an open end portion of a curved track of a cam, wherein the open end portion is a portion of the curved track which is open in a direction parallel to a longitudinal axis of the holding device,
  moving the at least one follower along a locking track portion of the curved track to a locking portion of the curved track, and
  locking the at least one follower in the locking portion;
 b) transferring the sample holder into or out of the vacuum chamber using the sample transfer apparatus; and
 c) releasing the sample holder from the holding device by:
  releasing the at least one follower from the locking portion, and
  moving the at least one follower along a releasing track portion of the curved track to the open end portion of the curved track,
 wherein the sample holder is mechanically connected to a base inside the vacuum chamber when the sample holder is transferred into the vacuum chamber, and
 wherein the sample holder is mechanically disconnected from the base inside the vacuum chamber when the sample holder is transferred out of the vacuum chamber.

13. The system of claim 12 wherein the system is a multi-stage adiabatic demagnetization refrigerator.

* * * * *